United States Patent
Jackson et al.

(10) Patent No.: US 6,731,382 B2
(45) Date of Patent: May 4, 2004

(54) SELF-CALIBRATING 3D MACHINE MEASURING SYSTEM USEFUL IN MOTOR VEHICLE WHEEL ALIGNMENT

(75) Inventors: David A. Jackson, Point Roberts, WA (US); Steven Glickman, Los Gatos, CA (US); Hoshang D. Shroff, Cupertino, CA (US); Brian M. Bliven, San Jose, CA (US); Michael J. Kling, III, Delafield, WI (US)

(73) Assignee: Snap-On Technologies, Inc., Lincolnshire, IL (US)

( * ) Notice: Subject to any disclaimer, the term of this patent is extended or adjusted under 35 U.S.C. 154(b) by 0 days.

(21) Appl. No.: 09/928,453

(22) Filed: Aug. 14, 2001

(65) Prior Publication Data

US 2002/0027651 A1 Mar. 7, 2002

Related U.S. Application Data

(60) Provisional application No. 60/224,891, filed on Aug. 14, 2000.

(51) Int. Cl.[7] ............................. G01B 11/26; G01B 5/24
(52) U.S. Cl. .............................. 356/139.09; 33/203.19; 33/288; 356/155; 700/59; 700/279
(58) Field of Search .............................. 356/139.09, 155; 33/288, 203.19; 700/279, 59

(56) References Cited

U.S. PATENT DOCUMENTS

| | | | |
|---|---|---|---|
| 3,882,482 A | * | 5/1975 | Green et al. |
| 5,148,591 A | * | 9/1992 | Pryor |
| 5,531,030 A | * | 7/1996 | Dale, Jr. .................. 33/203.18 |
| 5,532,816 A | * | 7/1996 | Spann et al. ........... 356/139.09 |
| 5,532,824 A | | 7/1996 | Harvey et al. |

(List continued on next page.)

FOREIGN PATENT DOCUMENTS

| | | |
|---|---|---|
| EP | 0948760 B1 | 5/1999 |
| EP | 0 948 760 | 10/1999 |

(List continued on next page.)

*Primary Examiner*—Stephen C. Buczinski
(74) *Attorney, Agent, or Firm*—McDermott, Will & Emery

(57) ABSTRACT

Techniques are disclosed for providing a system that has a plurality of devices in which the position of a device of the plurality of devices relative to another device of the plurality of devices is self-calibrated. In one embodiment, the system is a five-camera aligner for use in aligning motor vehicle wheels. In this embodiment, the aligner includes a first camera pod having two alignment cameras and a calibration camera, and a second camera pod having another two alignment cameras and a calibration target. Because the aligner has four alignment cameras and a calibration camera, the aligner is often referred to as a five-camera aligner. For illustration purposes, the first camera pod is herein referred to as the left camera pod and the second camera pod is herein referred to as the right camera pod. In one embodiment, the left camera pod is placed to the left of the aligner, and the right camera pod is placed to the right of the aligner. The two alignment cameras of the left camera pod focus at the two left wheels of the vehicle under alignment, while the two alignment cameras of the right camera pod focus at the two right wheels of the same vehicle. In addition, the calibration camera on the left pod focuses at the calibration target mounted in the right camera pod. In one embodiment, the relative positions of the elements (alignment camera, calibration camera, and calibration target) in each camera pod are pre-calibrated. Consequently, the aligner is fully calibrated when the position of the left camera pod to the right camera pod is measured. Further, the calibration camera is configured such that it periodically measures the position of the left camera pod relative to the right camera pod, rendering the aligner a self-calibrated aligner.

22 Claims, 14 Drawing Sheets

U.S. PATENT DOCUMENTS

| | | | |
|---|---|---|---|
| 5,724,128 A | * 3/1998 | January | 356/139.09 |
| 5,724,743 A | 3/1998 | Jackson | |
| 5,809,658 A | 9/1998 | Jackson et al. | |
| 5,909,379 A | 6/1999 | Dale, Jr. et al. | |
| 6,064,750 A | * 5/2000 | January et al. | 356/139.09 |
| 6,075,589 A | 6/2000 | Muller et al. | |
| 6,134,792 A | * 10/2000 | January | 356/139.09 |
| 6,148,528 A | 11/2000 | Jackson | |
| 6,237,234 B1 | 5/2001 | Jackson et al. | |
| 6,298,284 B1 | * 10/2001 | Burns, Jr. et al. | 700/279 |
| 6,313,911 B1 | * 11/2001 | Stieff | 356/139.09 |
| 6,424,411 B1 | 7/2002 | Rapidel et al. | |
| 6,594,600 B1 | 7/2003 | Arnoul et al. | |

FOREIGN PATENT DOCUMENTS

| | | | |
|---|---|---|---|
| EP | 1 003 011 A1 | | 5/2000 |
| EP | 1003011 | * | 5/2000 |
| WO | WO 99/22281 | | 5/1999 |
| WO | WO 01/71280 | | 9/2001 |
| WO | 0171280 | * | 9/2001 |

* cited by examiner

SELF-CALIBRATING 3D MACHINE MEASURING SYSTEM USEFUL IN MOTOR VEHICLE WHEEL ALIGNMENT

RELATED APPLICATION

The present application claims the benefit of priority from U.S. Provisional Patent Application Ser. No. 60/224,891, entitled "SELF-CALIBRATING 3D MACHINE MEASURING SYSTEM USEFUL IN MOTOR VEHICLE WHEEL ALIGNMENT," filed Aug. 14, 2000.

FIELD OF THE INVENTION

The present invention relates generally to motor vehicle wheel alignment and, more specifically, to providing a self-calibrating aligner having multiple cameras for aligning multiple wheels on one side of a vehicle.

BACKGROUND OF THE INVENTION

Machine vision measuring systems are used in many applications. For example, computer-aided, three-dimensional (3D) machine vision alignment apparatuses and related alignment methods are used in aligning wheels of motor vehicles. Examples of such apparatuses and methods are disclosed in U.S. Pat. No. 5,724,743, entitled "Method and Apparatus for Determining the Alignment of Motor Vehicle Wheels," issued to Jackson, et al. on Mar. 10, 1998 and in U.S. Pat. No. 5,535,522, entitled "Method and Apparatus for Determining the Alignment of Motor Vehicle Wheels," issued to Jackson, et al. on Jul. 16, 1996. The apparatus disclosed in these patents is sometimes called a "3D aligner" or an "aligner."

To align motor vehicle wheels, such 3D aligners use cameras that view targets affixed to the wheels. In one approach, one camera is used to view targets on one side of the vehicle, and another camera is used to view targets on the other side of the same vehicle. Unfortunately, in cases involving multiple wheels on one side of the vehicle that are distant apart, the field of view of the camera has to be fairly large to cover all of the wheels. This large field of view requires a larger target to subtend additional pixels to be viewed by the camera because a larger field of view with a smaller target renders inaccuracies in the alignment measurements. These larger targets take additional space, costs more, and, in many cases, are clumsy to handle. This is specifically true when there are multiple targets to handle. Further, the larger target requires that it be placed far away from the camera. In one arrangement, at least 8 feet is required from the camera to the head of the rack that supports the motor vehicle under alignment. Under these conditions, many smaller vehicle service shops cannot afford such a large space for the wheel aligner.

In addition, to accurately determine the position between the wheels on one side of the vehicle and the wheels on the other side of the vehicle, the aligner must know where one camera is positioned with respect to the other cameras. Therefore, the relative position of the two or more cameras must be measured and stored in a calibration process. According to one calibration method, a large target is positioned in the field of view of the cameras, typically along the centerline of the alignment rack, and away from the cameras. Information obtained from each camera is then used to determine the relative positions and orientations of the cameras. Since each camera indicates where the target is with respect to the camera itself, and since each camera is viewing the same target, the location and orientation of each camera with respect to the other camera can be calculated. Calculating the relative positions of the cameras is normally referred to as relative camera position (RCP) calibration.

Such calibration allows the results obtained from one side of the vehicle to be compared to the results obtained from the other side of the same vehicle. Thus, by mounting the two cameras rigidly with respect to each other and then performing an RCP calibration, the system can be used to locate the wheels on one side of the vehicle with respect to the other side of the vehicle from that point on. The RCP transfer function is used to convert one camera's coordinate system into the other camera's coordinate system so that a target viewed by one camera can be directly related to a target viewed by the other camera. One approach for performing an RCP is disclosed in U.S. Pat. No. 5,809,658, entitled "Method and Apparatus for Calibrating Cameras Used in the Alignment of Motor Vehicle Wheels," issued to Jackson, et al. on Sep. 22, 1998.

While RCP calibration is accurate, it requires special fixtures and a trained operator to perform. Thus, there is a need for an easier, simpler calibration process for an aligner. Further, even after calibration is performed, the aligner may be out of calibration. The aligner disclosed in the foregoing patents has cameras mounted on a boom that is designed to minimize loss of calibration. However, if the cameras are jarred or dismounted, or if the boom itself is bent, the aligner will be out of calibration. The aligner cannot detect loss of calibration itself. Normally, loss of calibration is not detected unless a calibration check is performed. A long time may elapse before the aligner's out-of-calibration is realized.

In addition, the boom is large, expensive and present an obstacle to vehicles entering and leaving the alignment rack. "Drive-through" alignment approaches may be used wherein a vehicle is driven forward into a service facility, aligned, and then driven forward to exit the service facility. This enables other motor vehicles to queue up behind the vehicle being serviced, improving the speed and efficiency of alignment services. In one approach of drive-through alignment that has a rigid boom, it is necessary to raise vehicle passes through. This can be time-consuming, costly, and clumsy. Automatic self-calibration has been disclosed in a co-pending patient application entitled "Self-Calibrating, Multi-Camera Machine Vision Measuring System," by Jackson et al., Ser. No. 09/576,442, filed on May 22, 2000. However, there are different approaches for an aligner to be calibrated.

Based on the foregoing, it is clearly desirable to provide a self-calibrating, multi-camera aligner that is improved over the aligner disclosed in the above-mentioned patents.

SUMMARY OF THE INVENTION

Techniques are disclosed for providing a system that has a plurality of devices in which the position of a device of the plurality of devices relative to another device of the plurality of devices is self-calibrated. In one embodiment, the system is a five-camera aligner for use in aligning motor vehicle wheels. In this embodiment, the aligner includes a first camera pod having two alignment cameras and a calibration camera and a second camera pod having another two alignment cameras and a calibration target. Because the aligner has four alignment cameras and a calibration camera, the aligner is often referred to as a five-camera aligner. For illustration purposes, the first camera pod is herein referred to as the left camera pod and the second camera pod is herein referred to as the right camera pod. In one embodiment, the left camera pod is placed to the left of the vehicle under alignment, and the right camera pod is placed to the right of the same vehicle. The two alignment cameras of the left camera pod focus at the two left wheels of the vehicle, while the two alignment cameras of the right camera pod focus at the two right wheels of the same vehicle. In addition, the calibration camera on the left pod focuses at the calibration target mounted in the right camera pod.

In one embodiment, the positions of the calibration camera and of the two alignment cameras in the left camera pod relative to one another is predetermined at the time the aligner is manufactured. Similarly, the positions of the calibration target and of the two alignment cameras in the right camera pod relative to one another is also predetermined at the time the aligner is manufactured. At the work site where the aligner is used for aligning wheels, the calibration camera is used to measure the position of the calibration camera relative to the calibration target. Because the position of the calibration camera relative to the calibration target is known, the position of the left camera pod relative to the right camera pod is known. In addition, because the position of the first alignment camera relative to the second alignment camera in the left camera pod is known, and the position of the first alignment camera relative to the second alignment camera in the right camera pod is known, the relative positions of the four alignments cameras are known. The aligner is thus said to have been calibrated and ready for use in aligning wheels.

In one aspect of the invention, the two camera pods are mounted on two respective frames, which, in turn, are mounted in a rack that supports the vehicle under alignment. In this aspect, the frames may be moved from one rack to another rack. Consequently, a service station may want to buy only one set of two camera pods for use in multiple racks. Further, the camera pods are moved (raised or lowered) with the rack.

In another aspect, the frames on which the camera pods are mounted are designed such that the frames are foldable to be hidden in the rack or to be arranged along the sides of the rack, to save space.

In another aspect, the camera pods are attached to a pair of towers, and, with appropriate mechanisms, the camera pods are also moveable with the rack.

In another aspect, the position of the left camera pod relative to the right camera pod is determined by using any camera to measure the position of the calibration camera relative to the calibration target. In this aspect, the (left) calibration camera may be substituted by a (left) calibration target. The position of the left calibration target in the left camera pod relative to the right calibration target in the right camera pod is thus determined by using a calibration camera that is external to both pods.

In another aspect, the left camera pod includes a left calibration camera and a left calibration target while the right camera pod includes a right calibration camera and a right calibration target. The left calibration camera is used to measure the position of the left calibration camera relative to the right calibration target, and the right calibration camera is used to measure the position of the right calibration camera relative to the left calibration target. Consequently, the calibration data of the relative positions of the left camera pod and the right camera pod that is provided by the left calibration camera and the right calibration camera should be substantially close. If the two sets of calibration data are not within an acceptable amount, then an alert alarm regarding the aligner's calibration is raised.

In another aspect, a "middle" calibration target is used to verify calibration of the aligner that is provided by the position of the calibration camera relative to the calibration target. The calibration data provided by the calibration camera relative to the calibration target is herein referred as the first set of calibration data while the calibration data provided by using the middle calibration target is herein referred to as the second set of calibration data. In order to obtain the second set of calibration data, the middle calibration target is placed such that its position can be determined by both an alignment camera in the left camera pod and by an alignment camera in the right camera pod. Further, the right camera pod is placed such that the position of the right calibration target can be determined by the left calibration camera. From the position of the middle calibration target relative to the left camera, the position of the middle calibration target relative to the right camera, the position of the left camera pod relative to the right camera pod is determined, which provides the second set of calibration data. If the difference between this second set of calibration data and the first set of calibration data is beyond a predetermined amount, then the aligner has failed the calibration. In one embodiment, the left and right cameras are rotated so that their lenses face the middle calibration target that is placed between the two cameras, and the two camera pods are brought closer together.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for providing a system that has a plurality of devices in which the position of a device of the plurality of devices relative to another device of the plurality of device is self-calibrated. These techniques are herein described in the context of a wheel aligner that has two camera pods each of which contains two alignment cameras, and the position of one camera pod relative to the other camera pod is self-calibrated.

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

System Overview

Figure 1:
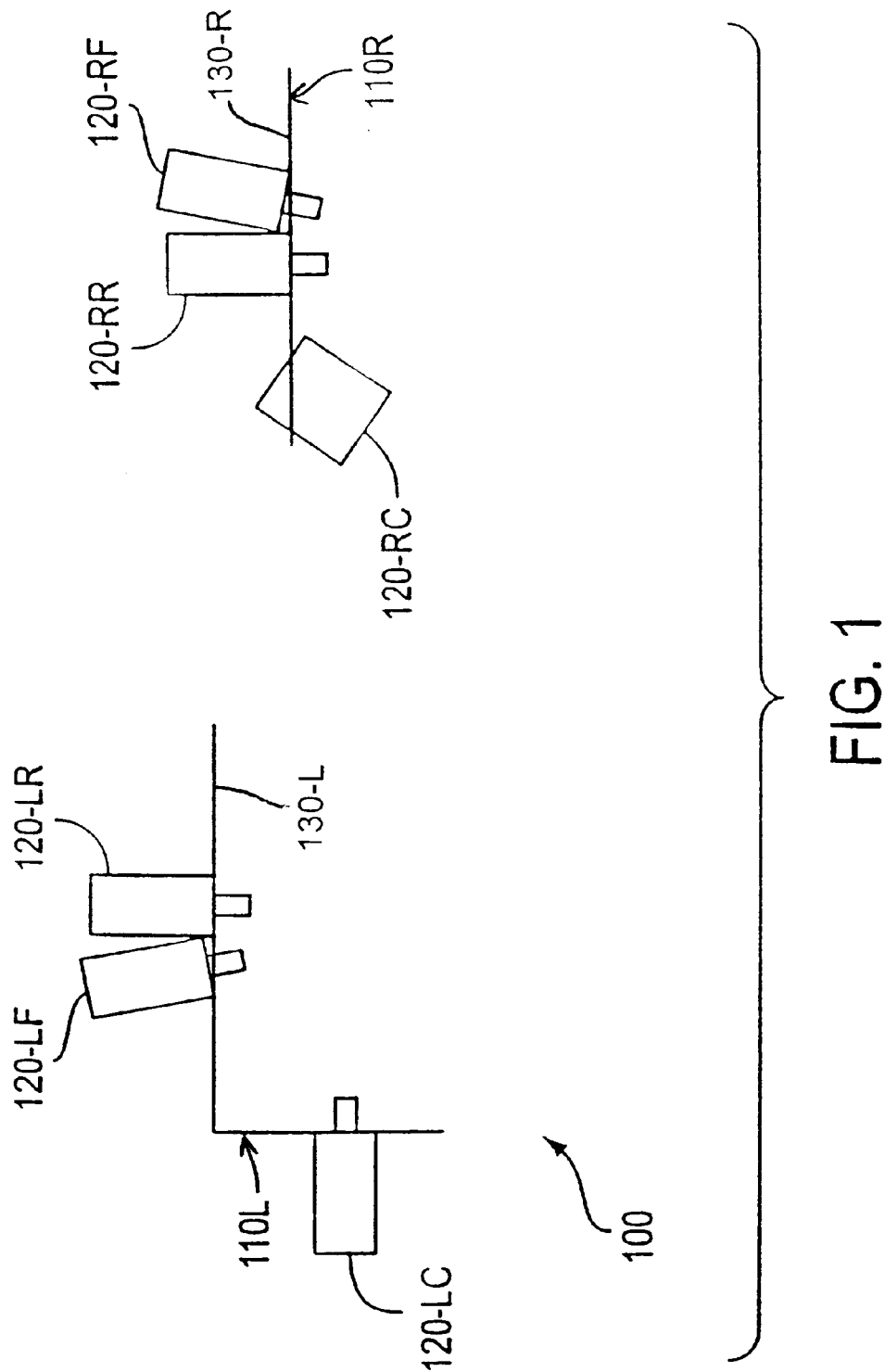
FIG. 1 shows an aligner in accordance with one embodiment.

FIG. 1 shows an aligner 100 having two camera pods. For illustration purposes, the camera pod on the left is herein referred to as the left camera pod 110L, and the camera pod on the right is herein referred to as the right camera pod 110R. Those skilled in the art will recognize that the terms "left" and "right" in this document are used for convenience, and are not intended to require a particular element to be located in a particular location or in relationship with respect to another element. Any element that is stated to be a left element may be placed in a right location, and the converse is also true.

In one embodiment, left camera pod 110L is used in alignment of wheels in the left side of a motor vehicle. Left camera pod 110L includes two alignment cameras, a left front camera 120-LF and a left rear camera 120-LR, and a calibration camera 120-LC. All three cameras 120-LF, 120-LR, and 120-LC are attached to a rigid frame 130L. Left front camera 120-LF and left rear camera 120-LR face the front and the rear wheel in the left hand side of the vehicle under alignment, respectively, so that alignments on these wheels may be performed. Calibration camera 120-LC, facing calibration target 120-RC located in right camera pod 110R, is used to measure (or calibrate) the position of calibration camera 120-LC relative to calibration target 120-RC. This relative position yields the position of left camera pod 110L relative to right camera pod 110R.

Similarly, right camera pod 110R is used in alignment of wheels in the right side of a motor vehicle. Right camera pod 110R also includes two alignment cameras, a right front camera 120-RF and a right rear camera 120-RR, and a calibration target 120-RC. Two cameras 120-RF and 120-RR and calibration target 120-RC are attached to a rigid frame 130R. Right front camera 120-RF and right rear camera 120-RR face the front and the rear wheels in the right hand side of the vehicle under alignment, respectively. Calibration target 120-RC is positioned in the field of view of calibration camera 120-LC. Calibration target 120-RC is used to determine the position of calibration camera 120-LC relative to calibration target 120-RC, which, in turn, yields the position of left camera pod 110L relative to right camera pod 110R.

Positions of Camera Pods

In accordance with techniques of the invention, camera pods 110 may be placed at different positions as long as they perform their intended functions, e.g., left camera pod 110L is for the left side of a vehicle under alignment, and right camera pod 110R is for the right side of the vehicle.

Figure 2:
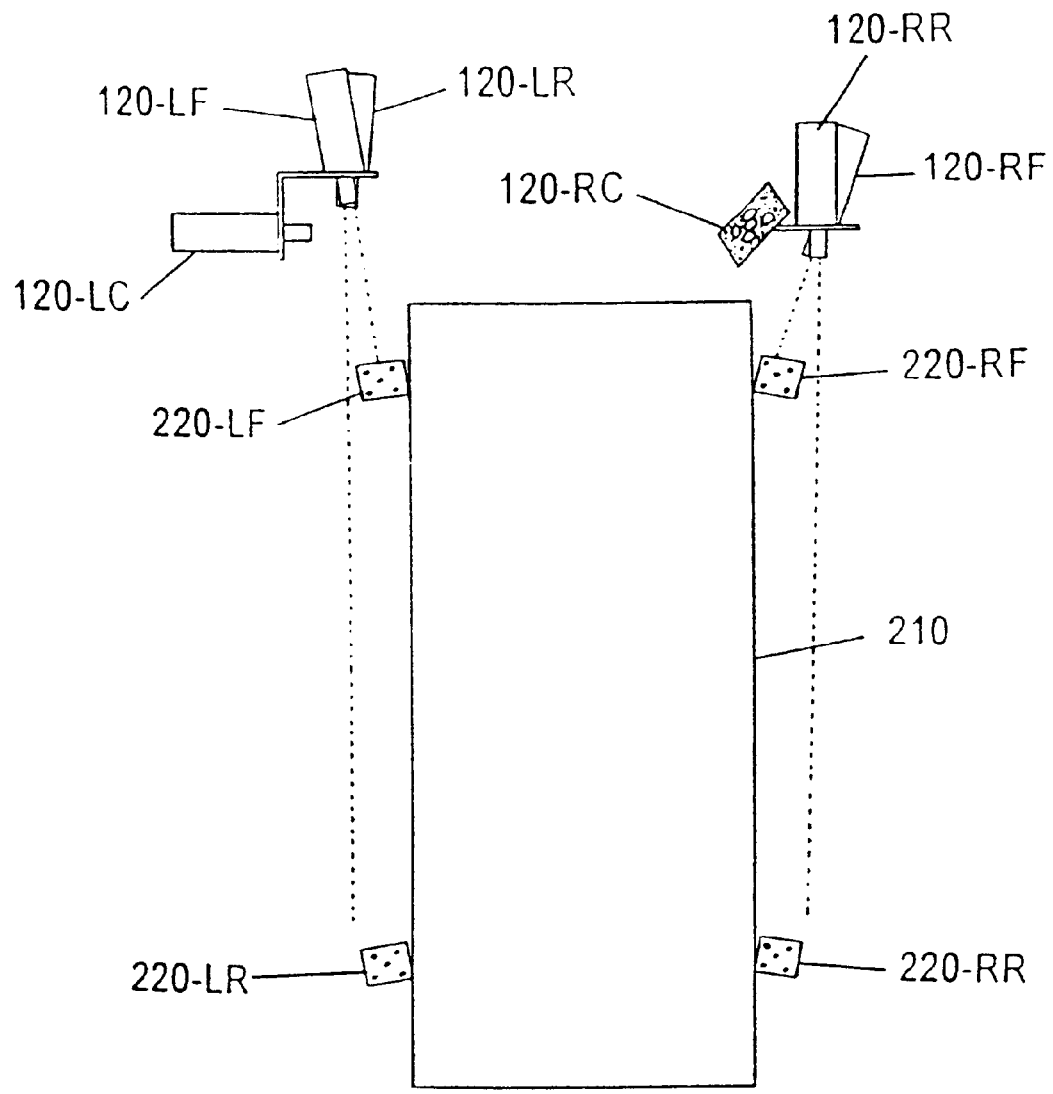
FIG. 2 shows positions of the camera pods of the aligner in FIG. 1 with respect to a motor vehicle under alignment.

FIG. 2 shows positions of camera pods 110 with respect to a vehicle 210. In performing alignments, each wheel of vehicle 210 has an alignment target 220-LF, 220-LR, 220-RF, and 220-RR attached to it, wherein LF, LR, RF, and RR stand for left front, left rear, right front, and right rear, respectively. Accordingly, alignment cameras 120-LF, 120-LR, 120-RF, and 120-RR face alignment targets 220-LF, 220-LR, 220-RF, and 220-RR respectively. Further, calibration camera 120-LC faces calibration target 120-RC for calibrating the position of calibration camera 120-LC relative to calibration target 120-RC, as required.

Figure 3A:
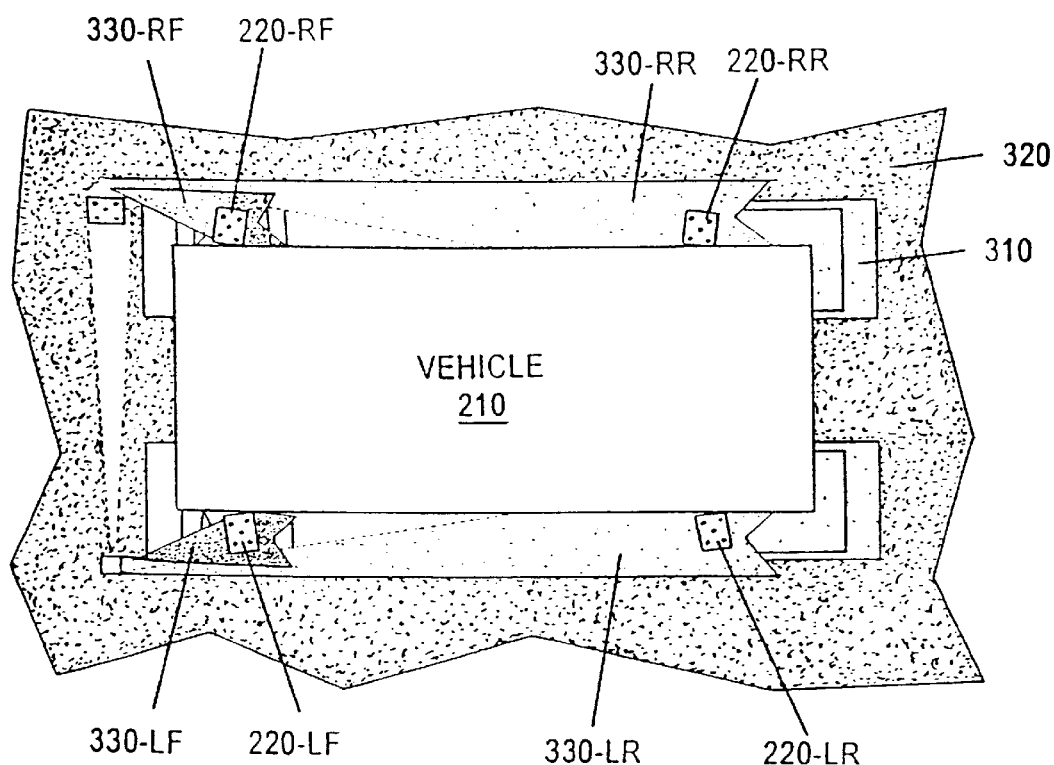
FIG. 3A shows a top view of a motor vehicle under alignment and related alignment tools.
Figure 3B:
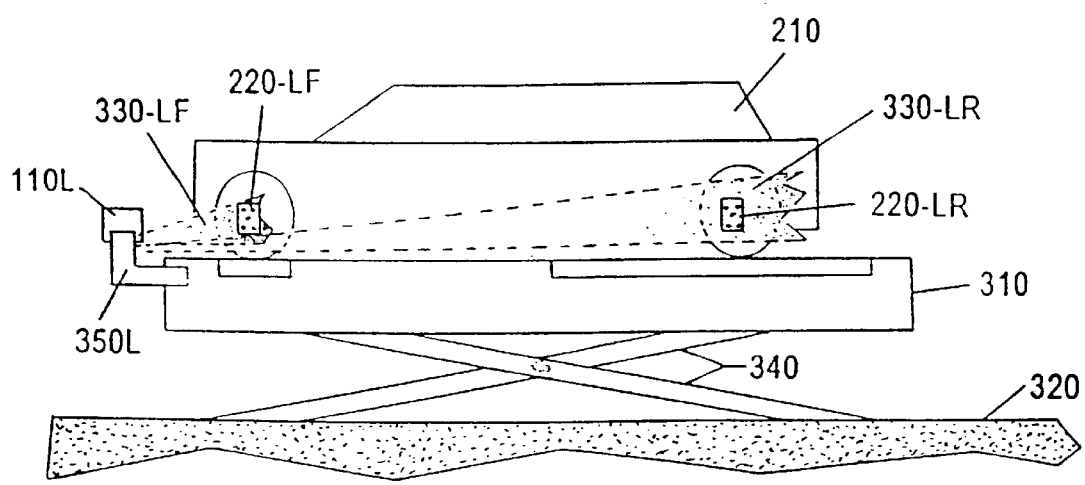
FIG. 3B shows the left-side view of the motor vehicle in FIG. 3A.
Figure 3C:
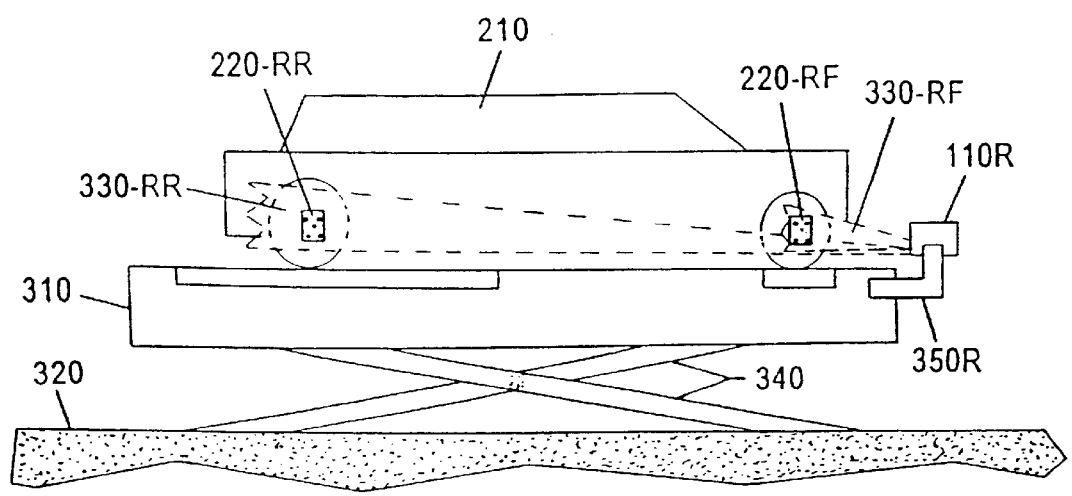
FIG. 3C shows the right-side view of the motor vehicle in FIG. 3A.

FIGS. 3A, 3B, and 3C show different views wherein camera pods 110 are removably attached to a rack 310 that supports vehicle 210. FIG. 3A shows a top view of vehicle 210 and related alignment tools. Shaded areas indicates that wheel targets 220-LF, 220-LR, 220-RF, and 220-RR are in the field of view of alignment cameras 120-LF, 120-LR, 120-RF, and 220-RR, respectively.

FIGS. 3B and 3C show the left-side view and the right-side view of vehicle 210, respectively. From these two views, rack 310 is shown to be raisable with supporting bars 340. Further, left camera pod 110L is attached to the left side of rack 310 using left support 350L, and right camera pod 110R is attached to the right side of rack 310 using right support 350R. In these FIGS. 3B and 3C, both camera pods 110 are moved up and down with rack 310. That is, both camera pods 110 are raised when rack 310 is raised, and are lowered when rack 310 is lowered.

In accordance with techniques of the invention, if another rack, for example 310-1 (not shown), is available for a vehicle to be aligned, but this rack 310-1 is not equipped with alignment camera pods, then alignment camera pods 110 are movable from rack 310 to rack 310-1. Consequently, rack 310-1 is now equipped with alignment camera pods 110, and, with appropriate calibrations for camera pods 110, rack 310-1 is ready for use in aligning vehicle wheels. As a result, a service station may need to purchase only one set of camera pods 110 for use in multiple racks.

In an alternative embodiment, left and right supports 350 are foldable to save space. With appropriate mechanisms, supports 350 are folded to be hidden in rack 310 or to be arranged along the sides of rack 310.

Figure 4:
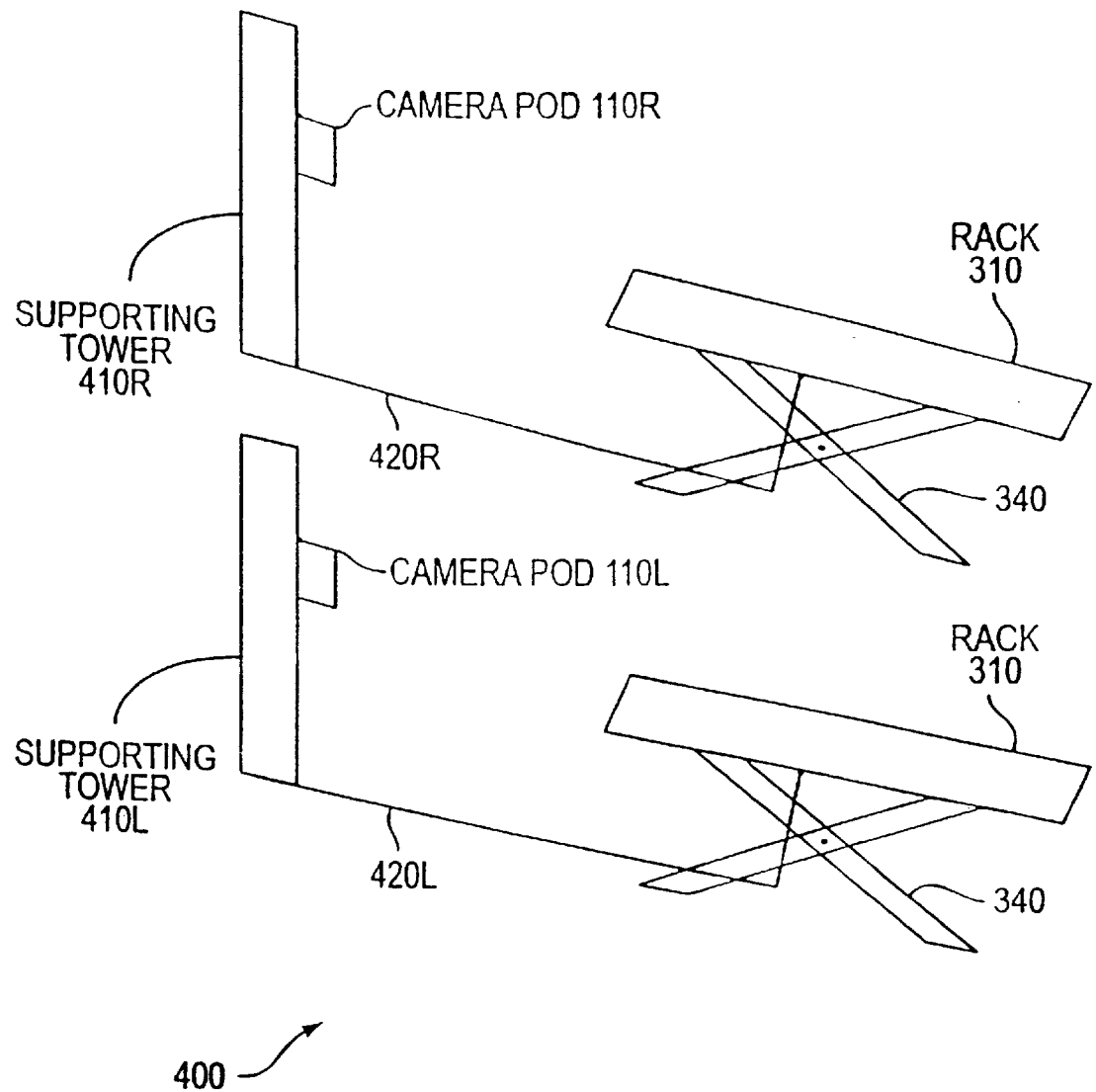
FIG. 4 shows an embodiment having the camera pods at an alternative location with respect to a rack.

FIG. 4 shows another alternative embodiment 400 having camera pods 110 at an alternative location with respect to a rack 310. This embodiment 400 includes two supporting towers 410L and 410R to support two camera pods 110L and 110R, respectively. In one embodiment, camera pods 110L and 110R are also moved up and down with rack 310, using cables 420L and 420R, respectively.

Figure 5:
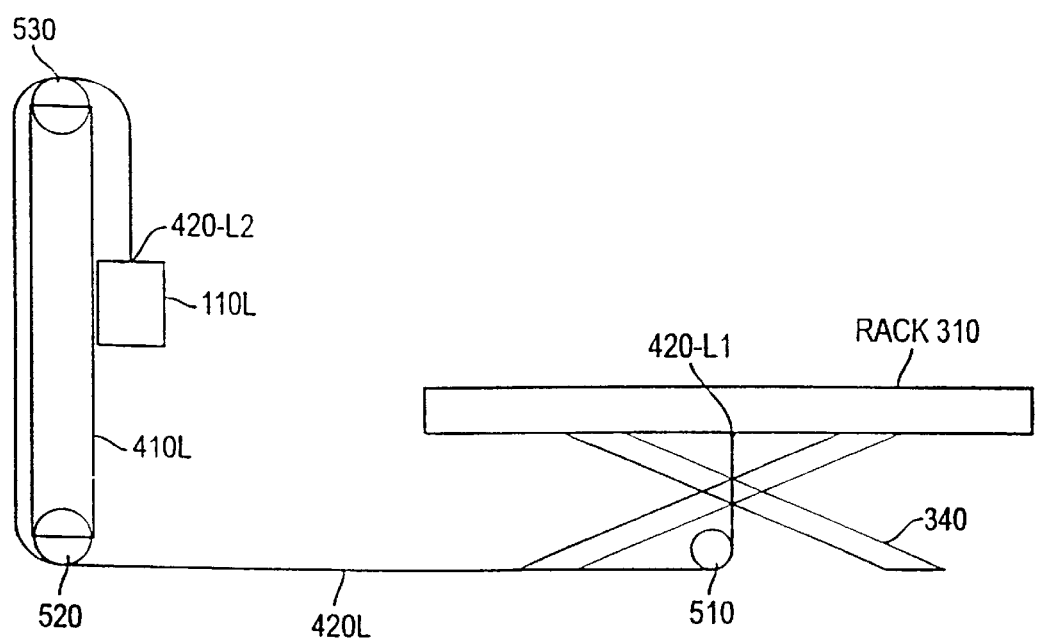
FIG. 5 shows a side view of a supporting tower to illustrate the movement of the left camera pod with respect to a rack.

FIG. 5 shows a side view of supporting tower 410L to illustrate the movement of left camera pod 110L with respect to rack 310. As discussed above, the term "left" is used for convenience only, the method for moving left camera pod 110L is also application to moving right camera pod 110R. FIG. 5 shows 3 pulleys 510, 520, and 530, and cable 420L having two ends 420-L1 and 420-L2. End 420-L1 of cable 420-L is connected to rack 310, and end 420-L2 of cable 420-L is connected to camera pod 110L. As rack 310 moves up, end 420-L1 moves up, which pulls end 420-L2, and thus causes camera pod 110L to move up. Similarly, as rack 310 moves down, end 420-L1 moves down, which pushes end 420-L2, and thus causes camera pod 110L to move down. Pulleys 510, 520, and 530 are used so that cable 420L can be moved smoothly.

System Calibration

In one aspect of the invention, elements (e.g., alignment camera, calibration camera, and calibration target) in camera pods 110 are manufactured and calibrated in such a way that, once manufactured, there is not any variations in the relative positions of these elements in each camera pod 110. Relative positions of two camera pods 110 are then measured, completing the calibration process for aligner 100. In one embodiment, relative positions of elements in each camera pod 110 are calibrated at the time aligner 100 is manufactured, and the calibration data for these elements are saved for later use in calibrating two camera pods 110. Further, calibration of two camera pods 110 is achieved at the service station where wheel alignments are performed. Because the relative positions of alignment cameras, calibration camera, and calibration targets in both camera pods 110L and 110R are calibrated, all alignment cameras are calibrated when the position of left camera pod 110L relative to right camera pod 110R is measured. In these conditions, aligner 100 is said to have been fully calibrated, and is ready for use in wheel alignments.

In one embodiment, left calibration camera 120-LC is used to measure the position of left calibration camera 120-LC relative to right calibration target 120-RC. Measurement of the position of left calibration camera 120-LC relative to right calibration target 120-RC yields the position of left camera pod 110L relative to right camera pod 110R because left calibration camera is affixed to left pod 110L, and right calibration target 120-RC is affixed to right camera pod 110R.

In one embodiment, calibration camera 120-LC is configured to periodically calibrate the position of left camera pod 110L relative to right camera pod 110R. Consequently, aligner 110 is a self-calibrating aligner. The time interval for calibrating aligner 110 varies, which could be several times per second, or one per day, or one per week, etc.

System Calibration-Variations

In accordance with techniques of the invention, calibration of left camera pod 110L to right camera pod 110R may be done in many various ways. Further, it is to be understood that once the position of left camera pod 110L relative to right camera pod 110R is measured, aligner 110 is calibrated.

Figure 6A:
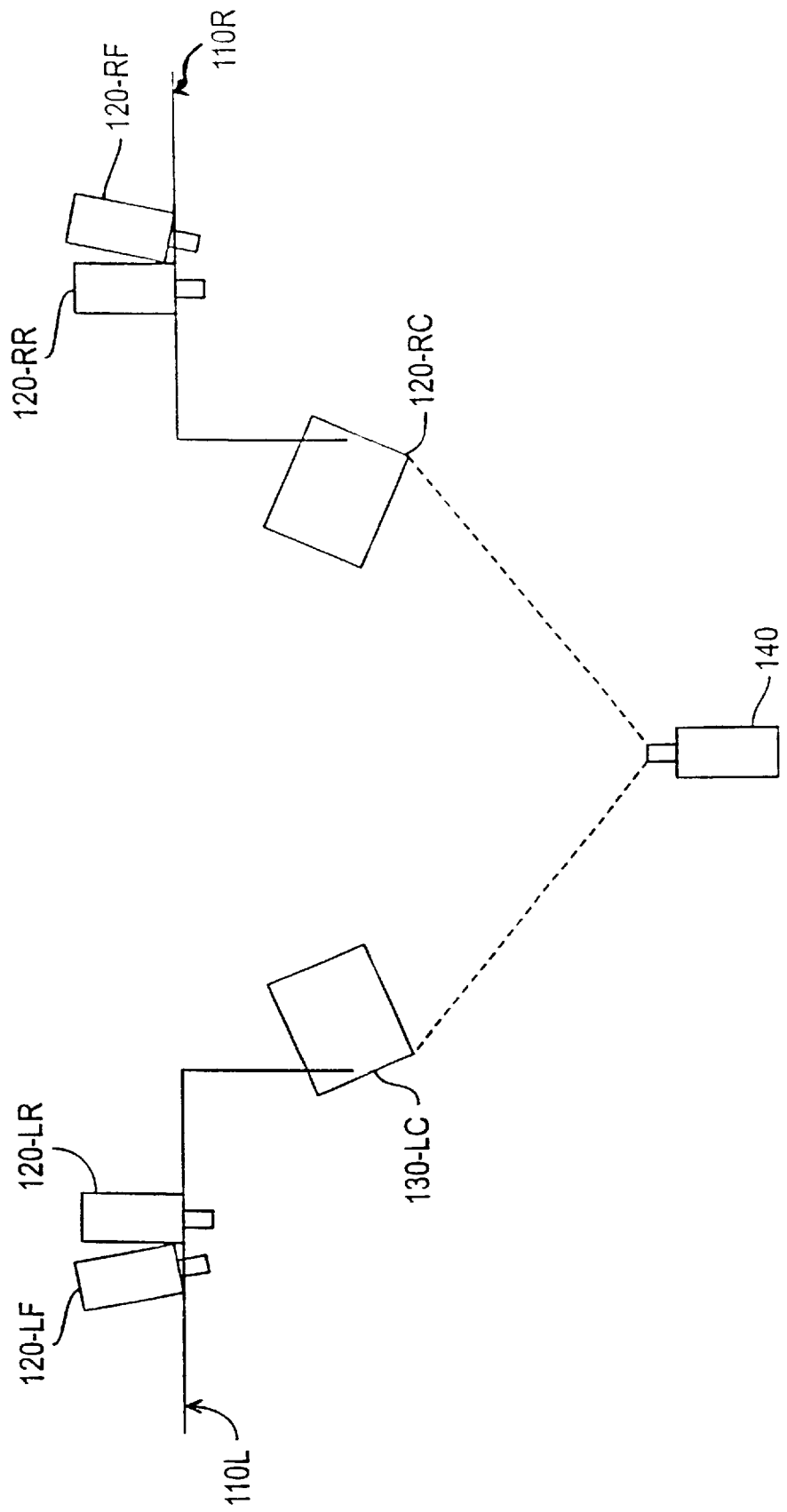
FIG. 6A shows an alternative embodiment of the camera pods to illustrate an alternative method for calibrating the camera pods.

FIG. 6A shows an alternative embodiment of pods 110 to illustrate an alternative method for calibrating camera pods 110. In this embodiment, calibration camera 120-LC in FIG. 1 is replaced by a left calibration target 130-LC, and the position of left camera pod 110L relative to right camera pod 110R is calibrated using the position of left calibration target 130-LC relative to (right) calibration target 120-RC. While there are many methods for measuring the position of left calibration target 130-LC relative to right calibration target 120-RC, one embodiment of the invention uses a calibration camera 140. Calibration camera 140 is positioned such that its field of view covers both left calibration target 130-LC and right calibration target 120-RC. Calibration camera 140 is then used to measure the position of calibration camera 140 relative to left calibration target 130-LC and of calibration camera 140 relative to right calibration target 120-RC. Based on the position of calibration camera 140 relative to left calibration target 130-LC and the position of calibration camera 140 relative to right calibration target 120-RC, the position of left calibration target 130-LC relative to right calibration target 120-RC is determined. In one embodiment, a camera tripod may be used to support calibration camera 140.

Figure 6B:
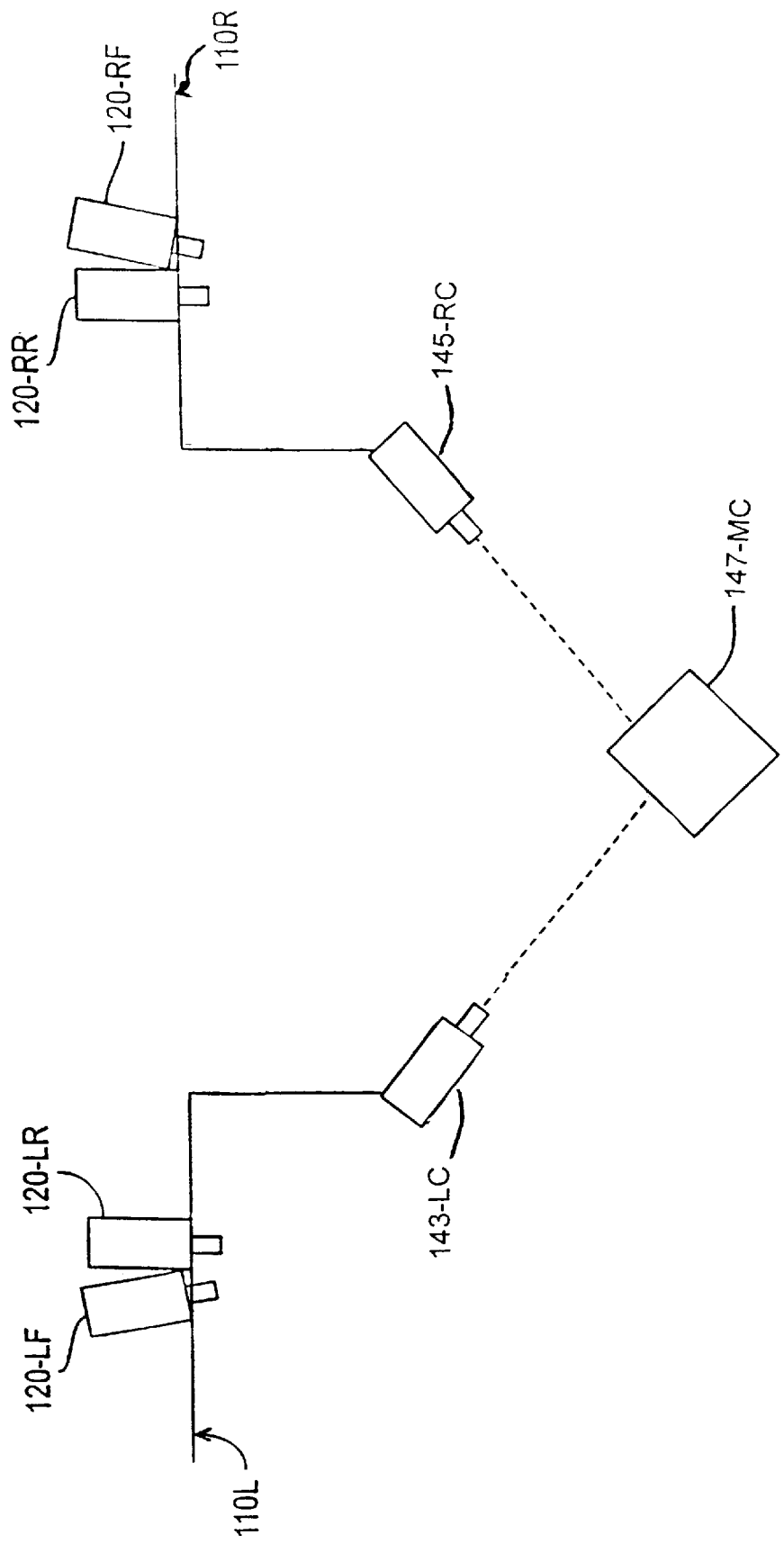
FIG. 6B shows another alternative embodiment of the camera pods to illustrate another alternative method for calibrating the camera pods.

FIG. 6B shows an alternative embodiment of camera pods 110 to illustrate an alternative method for calibrating camera pods 110. The embodiment in FIG. 6B is similar to that in FIG. 6A except that two calibration targets 130-LC and 120-RC are replaced by two calibration cameras 143-LC and 145-RC, respectively. Further, calibration camera 140 is replaced by a calibration target 147-MC. Calibration target 147-MC is positioned in the field of view of both cameras 143-LC and 145-RC. The position of calibration target 147-MC relative to calibration camera 143-LC and of calibration target 147-MC relative to calibration camera 145-RC is then measured by calibration cameras 143-LC and 145-RC, respectively. The position of two cameras 143-LC and 145-RC, one relative to another one, is determined based on the position of calibration target 147-MC relative to calibration camera 143-LC and of calibration target 147-MC relative to calibration camera 145-RC.

Figure 7:
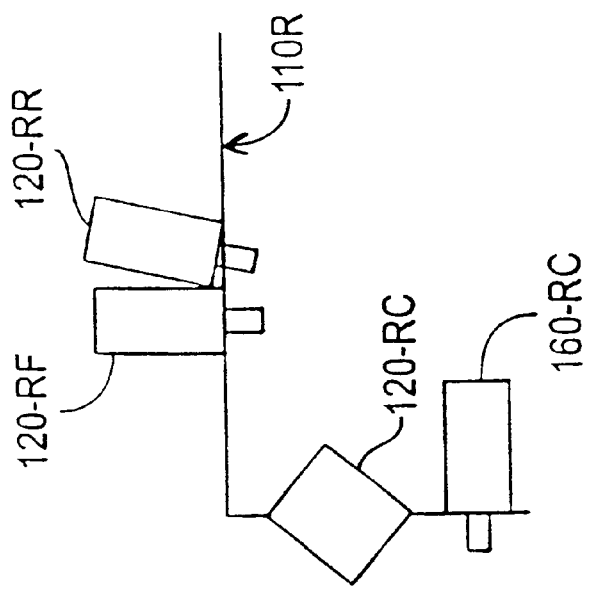
FIG. 7 shows another alternative embodiment of the camera pods to further illustrate an alternative method for calibrating the camera pods.
Figure 7:
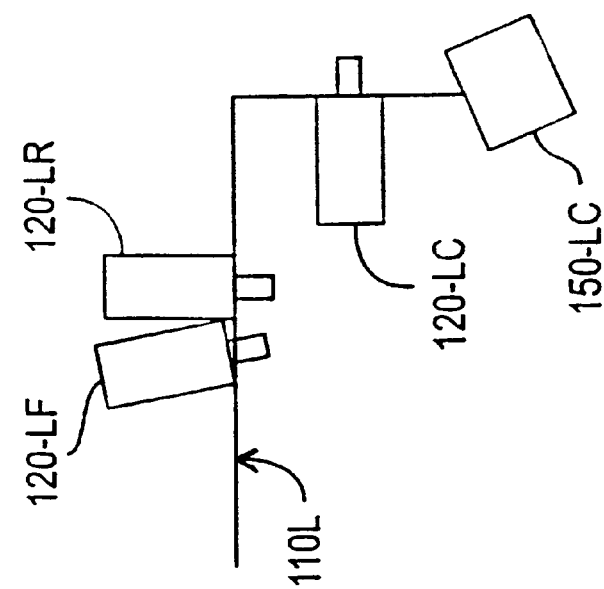

FIG. 7 shows another alternative embodiment of pods 110 to illustrate another alternative method for calibrating camera pods 110. This FIG. 7 embodiment also allows verifying calibrations of camera pods 110. In this embodiment, calibration camera 120-LC is herein referred to as left calibration camera 120-LC, and calibration target 120-RC is herein referred to as right calibration target 120-RC. In addition to left calibration camera 120-LC, left camera pod 110L includes a left calibration target 150-LC. Similarly, in addition to right calibration target 120-RC, right camera pod 110R includes a right calibration camera 160-RC. In this arrangement, left calibration camera 120-LC is used to measure the position of left calibration camera 120-LC relative to right calibration target 120-RC, while right calibration camera 160-RC is used to measure the position of right calibration camera 160-RC relative to left calibration target 150-LC. The two sets of calibration data provided by left calibration camera 120-LC and by right calibration camera 160-RC are then compared. If the two sets of data are within an acceptable variation, then aligner 100 is calibrated. However, if the difference between the two sets of calibration data is not acceptable, then an alert alarm is raised so that the calibration process may be re-verified.

Figure 8:
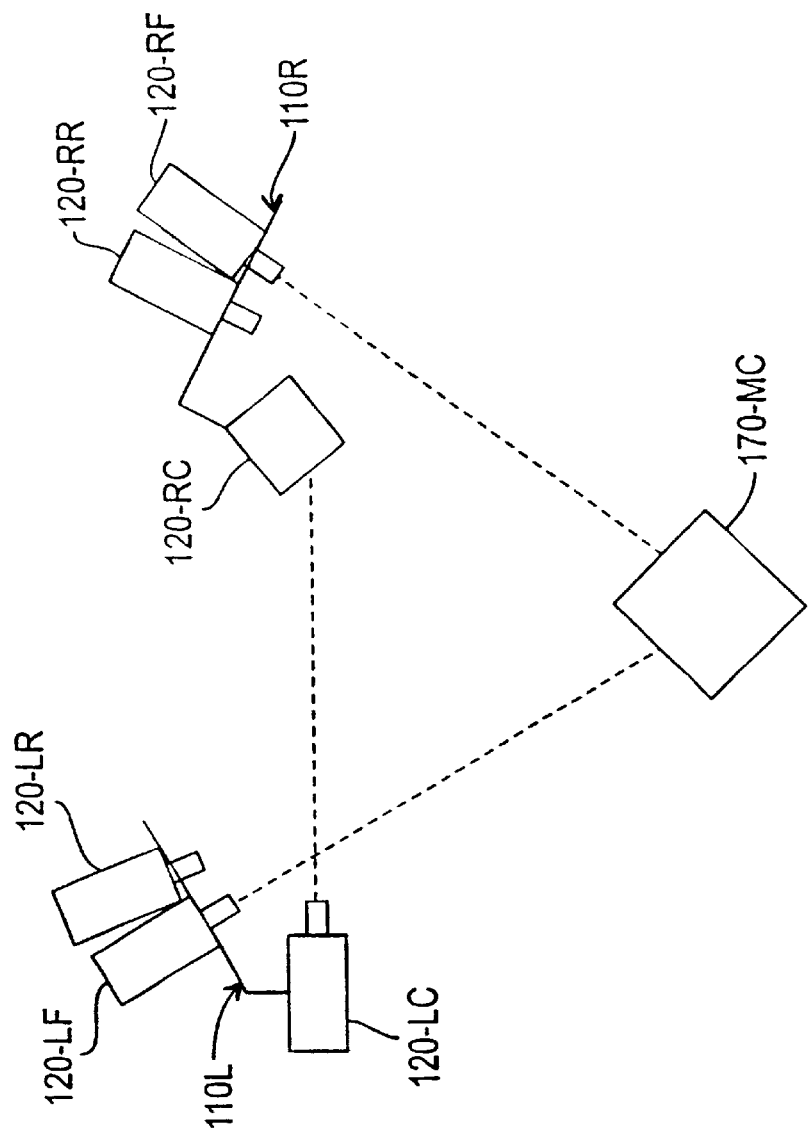
FIG. 8 shows one embodiment of the camera pods being used in conjunction with a middle calibration target to illustrate an alternative method for verifying calibrations of the camera pods.

FIG. 8 shows one embodiment of camera pods 110 being used in conjunction with a "middle" calibration target 170-MC to illustrate an alternative method for verifying calibrations of camera pods 110. In this embodiment, camera pods 110 are first calibrated using calibration camera 120-LC and calibration target 120-RC as described above. This calibration data (the first set of calibration data) is then compared with the calibration data provided by using calibration target 170-MC (the second set of calibration data). Obtaining the second set of calibration data is herein described. Calibration target 170-MC is positioned in the field of view of both an alignment camera (e.g., 120-LF) of left camera pod 110L and an alignment camera (e.g. 120-RF) of right camera pod 110R. Alignment camera 120-LF is used to measure the position of alignment camera 120-LF relative to middle calibration target 170-MC, while alignment camera 120-RF is used to measure the position of alignment camera 120-RF relative to middle calibration target 170-MC. The position of left camera pod 110L relative to right camera pod 110R is then measured based on the position of left alignment camera 120-LF relative to middle calibration target 170-MC and the position of right alignment camera 120-RF relative to middle calibration target 170-MC. If this (second) set of calibration data is substantially close to the first set of calibration data (described above), then camera pods 110 are calibrated. However, if this second set of calibration data differs from the first set of calibration data beyond an acceptable amount, then camera pods 110 fail calibration.

Calibrating Elements In Each Camera Pod

Calibration for a front alignment camera relative to a rear alignment camera in each camera pod 110 is herein described. For illustration purposes, the explanation refers to the left hand side. However, the calibration method is also applicable to the right hand side or to any camera pods having at least two cameras for viewing two different targets at different distances. In one embodiment, because the distance from front camera 120-LF to front calibration target 220-LF is different from the distance from rear camera 120-LR to rear calibration target 220-LR, the focal length of front camera 120-LF is set differently from the focal length of rear camera 120-LR. In one embodiment, for a "½" CCD, the focal length for front camera 120-LF is set at 10.7 mm, while, for the same CCD, the focal length for rear camera 120-LR is set at 25.3 mm. In one embodiment, a "middle" calibration target, e.g., calibration target 910 (FIG. 9) is used in determining the position of front camera 120-LF relative to rear camera 120-LR. Because of the difference in the focal lengths, two front and rear cameras 120-LF and 120-LR view calibration target 910 differently. In one embodiment, calibration target 910 includes two different targets, one is to be viewed by front camera 120-LF and one is to be viewed by rear camera 120-LR.

Figure 9:
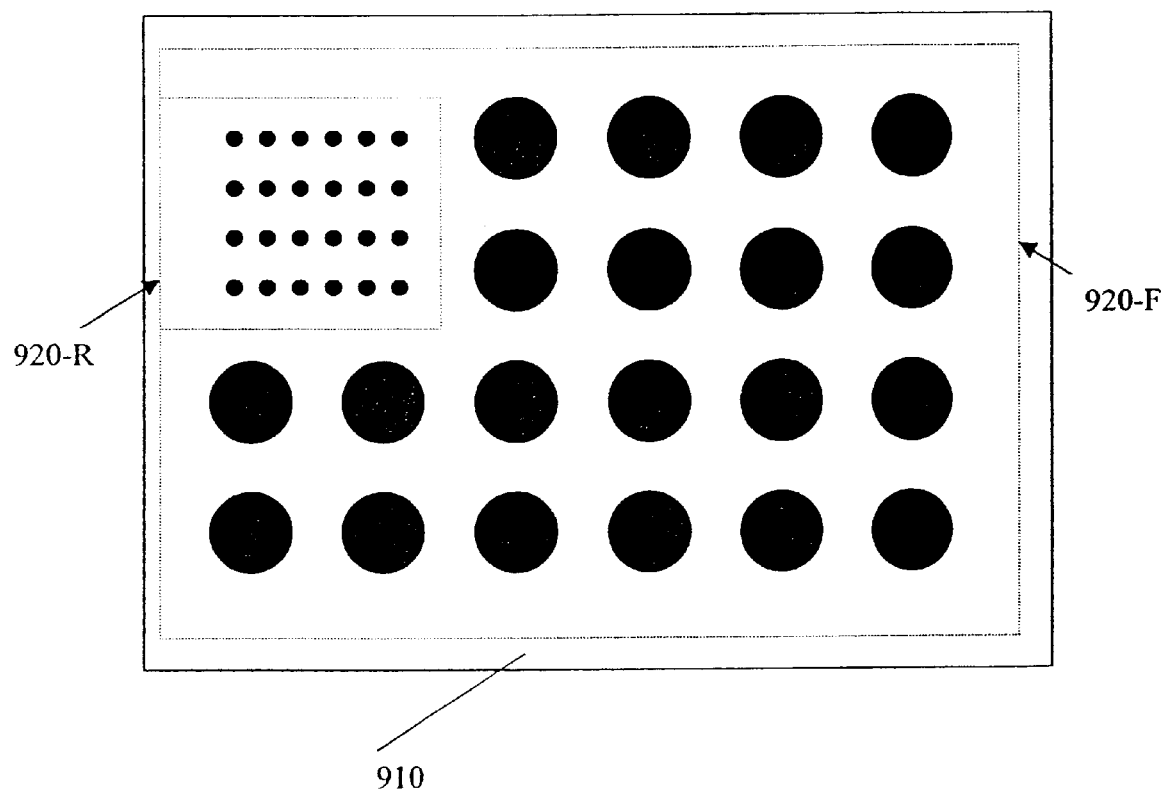
FIG. 9 shows a calibration target in accordance with one embodiment.

FIG. 9 shows a calibration target 910 in accordance with one embodiment. Calibration target 910 includes a target 920-F and a target 920-R to be viewed by front camera 120-LF and 120-LR, respectively. Target 920-F fills the field of view of front camera 120-LF while target 920-R fills the field of view of rear camera 120-LR. As shown in FIG. 9, target 920-R is smaller than target 920-F. In accordance with techniques of the invention, the size of targets 920 is a function of the focal length of the cameras to be used with targets 920. In one embodiment, the position of target 920-F relative to 920-R is predetermined.

Figure 10:
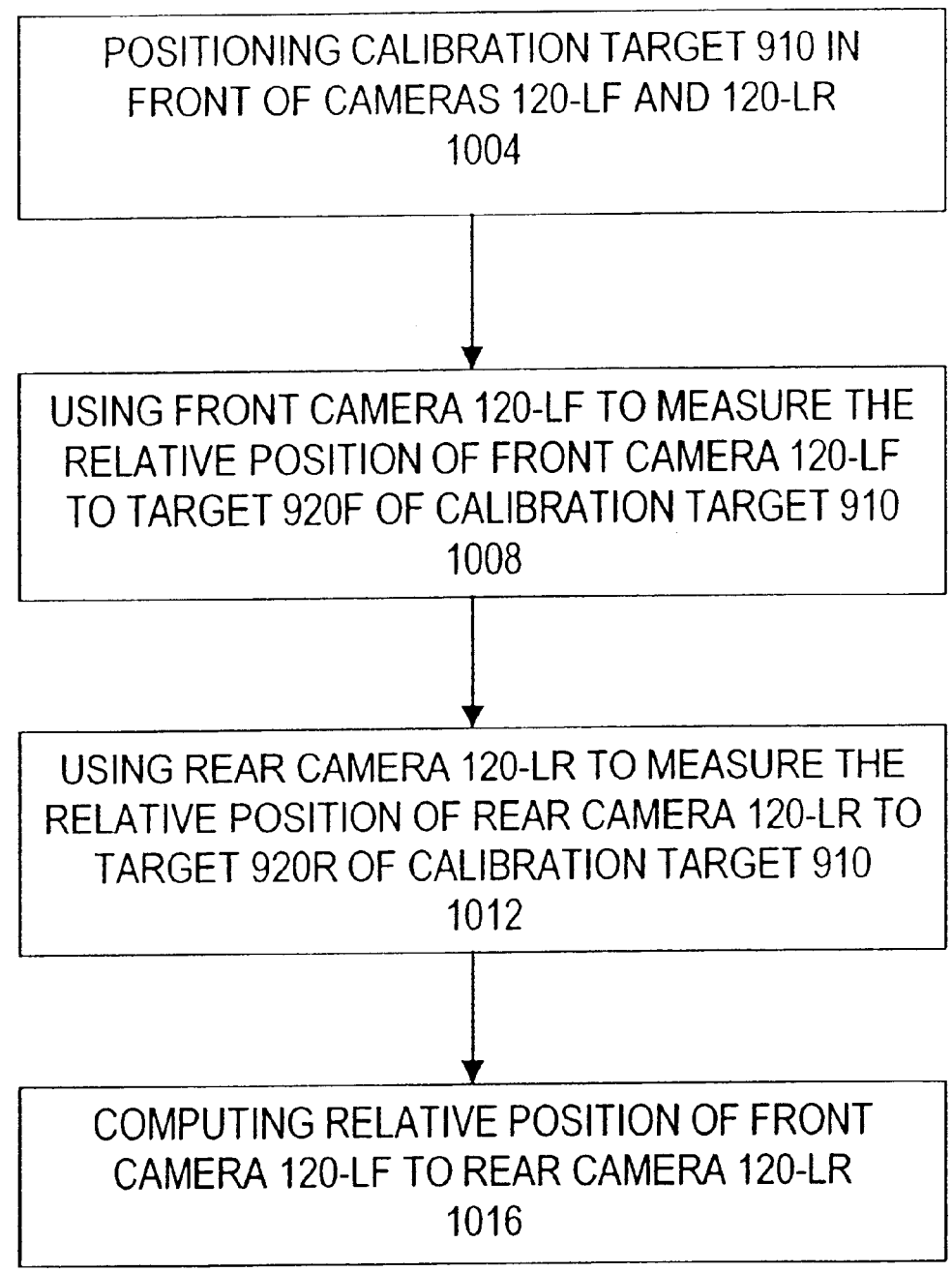
FIG. 10 is a flowchart illustrating a method for calibrating a front alignment camera to a rear alignment camera.

FIG. 10 is a flowchart illustrating a method for calibrating left front camera 120-LF to left rear camera 120-LR, using a target 910.

In step 1004, calibration target 910 is positioned in front of front cameras 120-LF and 120-LR.

In step 1008, front camera 120-LF is used to measure the position of front camera 120-LF relative to target 920-F of calibration target 910.

In step 1012, rear camera 120-LR is used to measure the position of rear camera 120-LR relative to target 920-R of calibration target 910.

In step 1016, the position of front camera 120-LF relative to rear camera 120-LR is calibrated based on 1) the position of front camera 120-LF relative to target 920-F (determined in step 1008), 2) the position of rear camera 120-LR relative to target 920-R (determined in step 1012), and 3) the predetermined position of target 920-F relative to target 920-R.

This embodiment of the invention is advantageous over the prior approaches because in this embodiment only one calibration target 910 having two targets 920-F and 920-R that are purposely designed for two cameras 120-LF and 120-LR is used. In contrast, in one prior approach, a calibration bar having two targets was used. This calibration bar is normally long and clumsy, and must be moved to different positions during the calibration process.

In left camera pod 110L, once the position of front camera 120-LF relative to rear camera 120-LR is calibrated, the position of calibration camera 120-LC relative to either front camera 120-LF or rear camera 120-LR is calibrated, which yields the relative positions of front camera-120-LF, rear camera 120-LR, and calibration camera 120-LC, one with respect to another one. The position of a calibration camera relative to an alignment camera (e.g., 120-LF or 120-LR) may be determined by different approaches, one of which is disclosed in U.S. Pat. No. 5,809,658, entitled "Method and Apparatus for Calibrating Cameras Used in the Alignment of Motor Vehicle Wheels," issued to Jackson et al. on Sep. 22, 1998, or in co-pending U.S. patent application Ser. No. 09/576,442, entitled "Self-calibrating, Multi-Camera Machine Vision Measuring System," filed on May 22, 2000. Both the patent and the co-pending application are herein incorporated by reference.

Similarly, in right camera pod 110R, once the position of front camera 120-RF relative to rear camera 120-RR is measured, the position of calibration target 120-RC relative to either front camera 120-RF or rear camera 120-RR is measured, which yields the relative positions of front camera-120-RF, rear camera 120-RR, and calibration target 120-RC, one with respect to another one. The position of a calibration target relative to an alignment camera (e.g., 120-RF or 120-RR) may be determined by different approaches, one of which is disclosed in the above-incorporated co-pending patent application.

Variations

In this document, specific elements (such as a camera, wheels), number of cameras in each pods, orientation of pods (e.g., left or right) are referred to for illustrative purposes only. Any image-capturing device that can capture target images can replace a camera. Similarly, any device, such as a measuring device, that can determine the relative positions of objects may be employed in calibrating the position of one pod 110 relative to another pod 110 or of elements in each pod 110.

Method for determining the relative position of elements in each pod 110 or between pods 110 may be used in applications other than wheel alignment.

Each camera pod 110 includes one or more alignment cameras, wherein one camera is responsible for one wheel. Since one camera is responsible for one wheel, images provided by the corresponding camera is tightly focused. Thus, techniques of the invention may be used for vehicles of different sizes or for vehicles having one, two, or more wheels. In addition, these cameras may be used for purposes other than aligning wheels, such as vehicle diagnostics etc.

Hardware Overview

Figure 11:
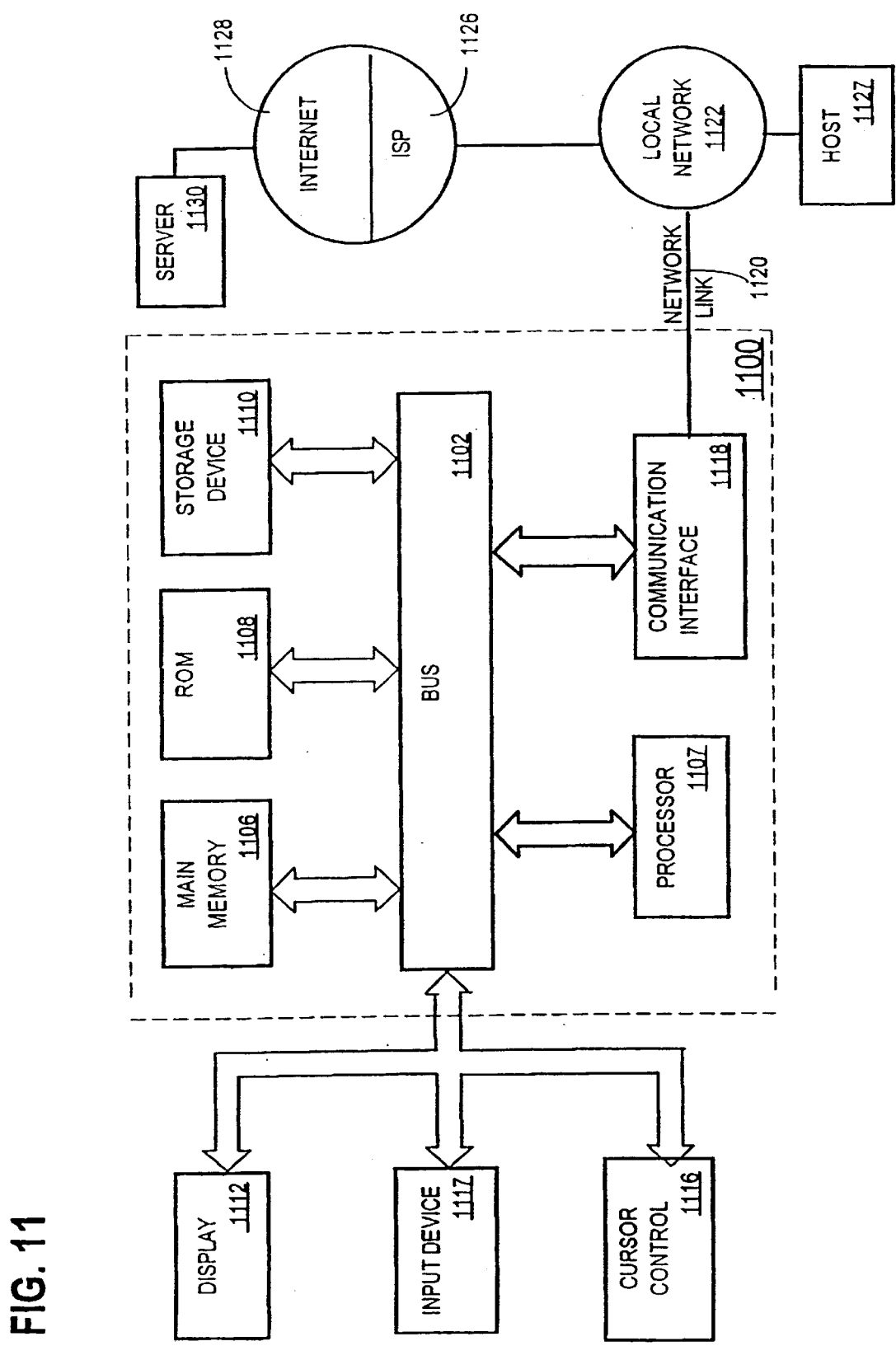
FIG. 11 shows a block diagram of a computer upon which an embodiment of the invention may be implemented.

FIG. 11 is a block diagram that illustrates a computer system 1100 upon which an embodiment of the invention may be implemented. In particular, computer system 1100 may be used to implement the above-described techniques. Computer system 1100 includes a bus 1102 or other communication mechanism for communicating information, and a processor 1104 coupled with bus 1102 for processing information. Computer system 1100 also includes a main memory 1106, such as a random access memory (RAM) or other dynamic storage device, coupled to bus 1102 for storing information and instructions to be executed by processor 1104. Main memory 1106 also may be used for storing temporary variables or other intermediate information during execution of instructions to be executed by processor 1104. Computer system 1100 further includes a read only memory (ROM) 1108 or other static storage device coupled to bus 1102 for storing static information and instructions for processor 1104. A storage device 1110, such as a magnetic disk or optical disk, is provided and coupled to bus 1102 for storing information and instructions.

Computer system 1100 may be coupled via bus 1102 to a display 1112, such as a cathode ray tube (CRT), for displaying information to a computer user. An input device 1114, including alphanumeric and other keys, is coupled to bus 1102 for communicating information and command selections to processor 1104. Another type of user input device is cursor control 1116, such as a mouse, a trackball, or cursor direction keys for communicating direction information and command selections to processor 1104 and for controlling cursor movement on display 1112. This input device typically has two degrees of freedom in two axes, a first axis (e.g., x) and a second axis (e.g., y), that allows the device to specify positions in a plane.

The invention is related to the use of computer system 1100 for implementing the techniques described herein. According to one embodiment of the invention, those techniques are implemented by computer system 1100 in response to processor 1104 executing one or more sequences of one or more instructions contained in main memory 1106. Such instructions may be read into main memory 506 from another computer-readable medium, such as storage device 1110. Execution of the sequences of instructions contained in main memory 1106 causes processor 1104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 1104 for execution. Such a medium may take many forms, including but not limited to, non-volatile media, volatile media, and transmission media. Non-volatile media includes, for example, optical or magnetic disks, such as storage device 1110. Volatile media includes dynamic memory, such as main memory 1106. Transmission media includes coaxial cables, copper wire and fiber optics, including the wires that comprise bus 1102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 1104 for execution. For example, the instructions may initially be carried on a magnetic disk of a remote computer. The remote computer can load the instructions into its dynamic memory and send the instructions over a telephone line using a modem. A modem local to computer system 1100 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to main memory 1106, from which processor 1104 retrieves and executes the instructions. The instructions received by main memory 1106 may optionally be stored on storage device 1110 either before or after execution by processor 1104.

Computer system 1100 also includes a communication interface 1118 coupled to bus 1102. Communication interface 1118 provides a two-way data communication coupling to a network link 1120 that is connected to a local network 52. For example, communication interface 1118 may be an integrated services digital network (ISDN) card or a modem to provide a data communication connection to a corresponding type of telephone line. As another example, communication interface 1118 may be a local area network (LAN) card to provide a data communication connection to a compatible LAN. Wireless links may also be implemented. In any such implementation, communication interface 1118 sends and receives electrical, electromagnetic or optical signals that carry digital data streams representing various types of information.

Network link 1120 typically provides data communication through one or more networks to other data devices. For example, network link 1120 may provide a connection through local network 52 to a host computer 1124 or to data equipment operated by an Internet Service Provider (ISP) 1126. ISP 1126 in turn provides data communication services through the world wide packet data communication network now commonly referred to as the "Internet" 1128. Local network 52 and Internet 1128 both use electrical, electromagnetic or optical signals that carry digital data streams. The signals through the various networks and the signals on network link 1120 and through communication interface 1118, which carry the digital data to and from computer system 1100, are exemplary forms of carrier waves transporting the information.

Computer system 1100 can send messages and receive data, including program code, through the network(s), network link 1120 and communication interface 1118. In the Internet example, a server 1130 might transmit a requested code for an application program through Internet 1128, ISP 1126, local network 52 and communication interface 1118. In accordance with the invention, one such downloaded application implements the techniques described herein.

The received code may be executed by processor 1104 as it is received, and/or stored in storage device 1110, or other non-volatile storage for later execution. In this manner, computer system 1100 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A position determination on system comprising:
    a first measuring module including:
        at least one measuring device; and
        a first calibration target;
    wherein the position of the at least one measuring device relative to the first calibration target is predetermined;
    a second measuring module including:
        at least one measuring device; and
        a second calibration target;
    wherein the position of the at least one measuring devices relative to the second calibration target is predetermined;
    a calibration measuring device for measuring the position of the first calibration target relative to the second calibration target; and a data processing system configured to couple to the calibration measuring device, the first measuring module and the second measuring module for determining a positional relationship of the at least one measuring device of the first measuring module relative to the at least one measuring device of the second measuring module based on the position of the first calibration target relative to the second calibration target, the position of the at least one measuring device of the first measuring module relative to the first calibration target, and the position of the at least one measuring device of the second measuring module relative to the second calibration target.

2. The system of claim 1, wherein the position of the first calibration target relative to the second calibration target is determined by:

using the calibration measuring device to measure the position of the calibration measuring device relative to the first calibration target;

using the same calibration measuring device to measure the position of the calibration measuring device relative to the second calibration target; an determining the position of the first calibration target relative to the second calibration target based on the position of the at least one measuring device of the first measuring module relative to the first calibration target, and the position of the at least one measuring device of the second measuring module relative to the second calibration target.

3. The system of claim 1, wherein:

the first measuring module further includes a first calibration measuring device; and the second measuring module further includes a second calibration measuring device;

wherein the first calibration measuring device is configured to determine the position of the first calibration measuring device relative to the second calibration target; and wherein the second calibration measuring device is configured to determine the position of the second calibration measuring device relative to the first calibration target.

4. The system of claim 3 wherein:

if the position of the first calibration measuring device relative to the second calibration target and the position of the second calibration measuring device relative to the first calibration target differs beyond a predetermined value, then an alert alarm is raised.

5. The system of claim 1, wherein the at least one measuring device of the first measuring module includes:

a first measuring device configured to determine the position of a first object; and a second measuring device configured to determine the position of a second object.

6. The system of claim 1, wherein:

the at least one measuring device of the first measuring module includes:
a first measuring device configured to determine the position of a first object; and
a second measuring device configured to determine the position of a second object; and the at least one measuring device of the second measuring module includes:
a third measuring device configured to determine the position of a third object; and a fourth measuring device configured to determine the position of a fourth object.

7. The system of claim 1 further comprising:

a rack; and a moving device;

wherein the moving device is configured to move the rack, the at least one measuring device of the first measuring module, and the at least one measuring device of the second measuring module at the same time.

8. The system of claim 7 wherein the moving device is configured to move the rack, the at least one measuring device of the first measuring module, and the at least one measuring device of the second measuring module at the same time by a method selected from a group consisting of:

raising the rack, the at least one measuring device of the first measuring module, and the at least one measuring device of the second measuring module; and lowering the rack, the at least one measuring device of the first measuring module, and the at least one measuring device of the second measuring module.

9. The system of claim 7 wherein the at least one measuring device of the first measuring module and the at least one measuring device of the second measuring module are removably affixed to the rack.

10. The system of claim 7 wherein the moving device comprises:

a first cable having a first end connected to the at least one measuring device of the first measuring module and a second end connected to the rack; and a second cable having a first end connected to the at least one measuring device of the second measuring module and a second end connected to the rack;

whereby the at least one measuring device of the first measuring module, the at least one-measuring device of the second measuring module, and the rack are movable at the same time.

11. A system comprising:

a first measuring device;

a second measuring device;

a calibration target having
a first calibration pattern; and
a second calibration pattern;
wherein the position of the first calibration pattern relative to the second calibration pattern is predetermined; and a data processing system configured to couple to the first and second measuring devices, and to determine a positional relationship of the first measuring device relative to the second measuring device based on
the position of the first calibration pattern relative to the second calibration pattern,
the position of the first measuring device relative to the first calibration pattern, and
the position of the second measuring device relative to the second calibration pattern;

wherein the first calibration pattern is configured for specific use by the first measuring device; and wherein the second calibration pattern is configured for specific use by the second measuring device.

12. The system of claim 11 wherein:

the first measuring device is configured to determine the position of the first measuring device relative to the first calibration pattern; and the second measuring device is configured to determine the position of the second measuring device relative to the second calibration pattern.

13. A position determination system, comprising:
- a first measuring module, including a first set of a plurality of measuring devices for obtaining positional data of a first testing target relative to the first set of the plurality of measuring devices; and
- a calibration target rigidly linked to the first set of the plurality of measuring devices, wherein the positional relationship between the first set of the plurality of measuring devices and the calibration target is known;
- a second measuring module, including a second set of a plurality of measuring devices for obtaining positional data of a second testing target relative to the second set of the plurality of measuring devices; and
- a calibration measuring device rigidly linked to the second set of the plurality of measuring devices for obtaining positional data of the calibration target relative to the calibration measuring device, wherein the positional relationship between the second set of the plurality of measuring devices and the calibration measuring device is known; and
- a data processing system configured to couple to the first and second sets of the plurality of measuring devices, and to determine positional information of the testing targets based on the positional data of the first testing target relative to the first set of the plurality of measuring devices, the positional data of a second testing target relative to the second set of the plurality of measuring devices, the positional data of the calibration target relative to the calibration measuring device, the positional relationship between the first set of the plurality of measuring devices and the calibration target, and the positional relationship between the second set of the plurality of measuring devices and the calibration measuring device.

14. A machine-readable medium bearing instructions for controlling the operation of a position determination system comprising a first measuring module, a second measuring module, and a data processing system configured to couple to both of the measuring modules, the first measuring module in including a first set of a plurality of measuring devices for obtaining positional data of a first testing target relative to the first set of the plurality of measuring devices, and a calibration target rigidly linked to the first set of the plurality of measuring devices, wherein the positional relationship between the first set of the plurality of measuring devices and the calibration target is known; the second measuring module including a second set of a plurality of measuring device for obtaining positional data of a second testing target relative to the second set of the plurality of measuring devices, and a calibration measuring device rigidly linked to the second set of the plurality of measuring devices for obtaining positional data of the calibration target relative to the calibration measuring device, wherein the positional relationship between the second set of the plurality of measuring devices and the calibration measuring device is known; the machine-readable medium comprising instructions for controlling the data processing system to perform the machine-implemented steps of:
- receiving the positional data of the first testing target relative to the first set of the plurality of measuring devices;
- receiving the positional data of a second testing target relative to the second set of the plurality of measuring devices; and
- determining positional information of the first and second testing targets based on the positional data of the first testing target relative to the first set of the plurality of measuring devices, the positional data of a second testing target relative to the second set of the plurality of measuring devices, the positional data of the calibration target relative to the calibration measuring device, the positional relationship between the first set of the plurality of measuring devices and the calibration target, and the positional relationship between the second set of the plurality of measuring devices and the calibration measuring device.

15. A machine-readable medium bearing instructions for controlling the operation of a position determination system for determining positional parameters of an object, the position determination system including a first measuring module, a second measuring module, a common calibration target, and a data processing system configured to couple to both of the measuring modules; the first measuring module having a first measuring device and a calibration measuring device, wherein the position of the first measuring device relative to the calibration measuring device is predetermined; and the second measuring module including a second measuring device and a calibration target, wherein the position of the second measuring device relative to the second calibration target is predetermined;
- the machine-readable medium comprising instructions for controlling the data processing system to perform the machine-implemented steps of:
  - receiving signals representing the relative position of the first measuring device relative to the common calibration target;
  - receiving signals representing the relative position of the second measuring device relative to the common calibration target;
  - determining a first set of calibration data representing the position of the first measuring device relative to the second measuring device based on the position of the first measuring device relative to the common calibration target, and the position of the second measuring device relative to the common calibration target;
  - determining a second set of calibration data representing the position of the first measuring device relative to the second measuring device based on the position of the calibration measuring device relative to the calibration target; and
  - comparing the first set of calibration data to the second set of calibration data to determine if the second set of calibration data differs from the first set of calibration data by more than a predetermined amount.

16. The machine-readable medium of claim 15, wherein the second set of calibration data is determined based on the position of the calibration measuring device relative to the calibration target, the position of the first measuring device relative to the calibration measuring device, and the position of the second measuring device relative to the calibration target.

17. A position determination system comprising:
- a first measuring module, including
  - a first set of a plurality of measuring means for obtaining positional data of an object relative to the first set of the plurality of measuring means; and
  - calibration target means rigidly linked to the first set of the plurality of measuring means,
  - wherein the positional relationship between the first set of the plurality of measuring means and the calibration target means is known;

a second measuring module, including
- a second set of a plurality of measuring mean for obtaining positional data of an object relative to the second set of the plurality of measuring devices; and
- calibration measuring means rigidly linked to the second set of the plurality of measuring means for obtaining positional data of the calibration target means relative to the calibration measuring means,
- wherein the positional relationship between the second set of the plurality of measuring means and the calibration measuring mean is known; and a data processing system configured to couple to the first and second sets of the plurality of measuring means, and to determine the positional relationship between the first set of measuring means and second set of measuring means based on the positional relationship between the calibration target means and the calibration measuring means.

18. A position determination system comprising:

a first measuring module, including
- a first measuring device for obtaining position data of a first object; and
- a first calibration measuring device rigidly linked to the first measuring device for use with a calibration target to generate positional signals representing the relative position between the first calibration measuring device and the calibration target;
- wherein the positional relationship between he first measuring device and the first calibration measuring device is known;

a second measuring module, including
- a second measuring device for obtaining positional data of a second object; and
- a second calibration measuring device rigidly linked to the second measuring device for use with the calibration target to generate positional signals representing the relative position between the second calibration measuring device and the calibration target;
- wherein the positional relationship between the second measuring device and the second calibration measuring device is known; and a data processing system configured to couple to the first and second calibration measuring devices, and to determine the relative position between the first and second measuring devices based on the positional relationship between the first measuring device and the first calibration measuring device, the positional relationship between the second measuring device and the second calibration measuring device, the relative position between the first calibration measuring device and the calibration target, and the relative position between the second calibration measuring device and the calibration target.

19. A system for use in determining relative positions of a plurality of sets of objects, the system comprising:

a first measuring module including:
- a first set of at least one measuring means; and
- a first calibration target means;
- wherein the position of the first set of measuring means relative to the first calibration target means is predetermined;

a second measuring module including:
- a second set of at least one measuring means; and
- a second calibration target means;
- wherein the position of the second set of measuring means relative to the second calibration target means is predetermined; and a data processing system configured to couple to the first measuring module and the second measuring module for determining a positional relationship of the first set of measuring means relative to the second set of measuring means based on the position of the first calibration target means relative to the second calibration target means.

20. A position determination system comprising:

a first measuring module, including
- a first measuring means for obtaining positional data of a first object; and
- a first calibration measuring means rigidly linked to the first measuring means for use with a calibration target means to generate positional signals representing the relative position between the first calibration measuring means and the calibration target means;
- wherein the positional relationship between the first measuring means and the first calibration measuring means is known;

a second measuring module, including
- a second measuring means for obtaining positional data of a second object; and
- a second calibration measuring means rigidly linked to the second measuring means for use with the calibration target means to generate positional signals representing the relative position between the second calibration measuring means and the calibration means;
- wherein the positional relationship between the second measuring means and the second calibration measuring means is known; and a data processing system configured to couple to the first and second calibration measuring means, and to determine the relative position between the first and second measuring means based on the positional relationship between the first measuring means and the first calibration measuring means, the positional relationship between the second measuring means and the second calibration measuring means, the relative position between the first calibration measuring means and the calibration target means, and the relative position between the second calibration measuring means and the calibration target means.

21. A position determination system for use with a calibration target having a first calibration pattern and a second calibration pattern, wherein the position of the first calibration pattern relative to the second calibration pattern is predetermined, the system comprising:

first measuring means for viewing the first calibration pattern and generating a signal representing the relative position between the first measuring means and the first calibration pattern;

second measuring means for viewing the second calibration pattern generating a signal representing the relative position between the second measuring means and the second calibration pattern; and a data processing system configured to couple to the first and second measuring means, and to determine a positional relationship of the first measuring means relative to the second measuring means based on
- the position of the first calibration pattern relative to the second calibration pattern,
- the relative position between the first measuring means and the first calibration pattern, and
- the relative position between the second measuring means and the second calibration pattern.

22. A method for calibrating a position determination system that includes a first measuring module, a second measuring module and a common calibration measuring device, wherein the first measuring module comprising at least one measuring device and a first calibration target having a predetermined positional relationship with the at least one measuring device; and the second module comprising at least one measuring device and a second calibration target having a predetermined positional relationship with the at least one measuring device; the method comprising the machine-implemented steps of:

receiving data representing a first positional relationship between the common calibration measuring device and the first calibration target obtained by the common calibration measuring device;

receiving data representing a second positional relationship between the common calibration measuring device and the second calibration target obtained by the common calibration measuring device;

accessing data representing the positional relationship between the first calibration target and the at least one measuring device of the first measuring module;

accessing data representing the positional relationship between the second calibration target and the at least one measuring device of the second measuring module; and calculating a positional relationship between the at least one measuring device of the first measuring module and the at least one measuring device of the second measuring module based on the first positional relationship between the common calibration measuring device and the first calibration target obtained by the common calibration measuring device, the second positional relationship between the common calibration measuring device and the second calibration target obtained by the common calibration measuring device, the positional relationship between the first calibration target and the at least one measuring device of the first measuring module, and the positional relationship between the second calibration target and the at least one measuring device of the second measuring module.

* * * * *